(12) United States Patent
Xu et al.

(10) Patent No.: US 11,133,682 B2
(45) Date of Patent: Sep. 28, 2021

(54) BATTERY CHARGING SYSTEM AND A METHOD THEREOF

(71) Applicant: Chengdu Monolithic Power Systems Co., Ltd., Chengdu (CN)

(72) Inventors: Min Xu, Hangzhou (CN); Lei Du, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 295 days.

(21) Appl. No.: 16/559,524

(22) Filed: Sep. 3, 2019

(65) Prior Publication Data

US 2020/0076207 A1    Mar. 5, 2020

(30) Foreign Application Priority Data

Sep. 5, 2018  (CN) .......................... 201811030376.1

(51) Int. Cl.
*H02J 7/00*        (2006.01)

(52) U.S. Cl.
CPC .......... *H02J 7/0019* (2013.01); *H02J 7/0016* (2013.01); *H02J 7/00712* (2020.01); *H02J 7/007182* (2020.01)

(58) Field of Classification Search
CPC ................. H02J 7/0019; H02J 7/00712; H02J 7/007182; H02J 7/0016
USPC ....................................................... 320/118
See application file for complete search history.

(56) References Cited

U.S. PATENT DOCUMENTS

| | | | |
|---|---|---|---|
| 7,723,955 B2* | 5/2010 | Zaag ...................... | B60L 58/15 |
| | | | 320/118 |
| 8,350,528 B2* | 1/2013 | Yang ..................... | H02J 7/0016 |
| | | | 320/118 |
| 8,525,423 B2 | 9/2013 | Yu et al. | |
| 9,136,717 B2* | 9/2015 | Kashima ............... | H02J 7/0016 |
| 9,340,122 B2* | 5/2016 | Yamauchi .............. | B60L 58/14 |
| 9,397,371 B2* | 7/2016 | Nishi ................ | H01M 10/4207 |
| 9,577,458 B2* | 2/2017 | Kaita .................. | H02J 7/00306 |
| 9,673,640 B2* | 6/2017 | Kudo ...................... | B60L 58/22 |
| 9,692,239 B2* | 6/2017 | Drobnik ................ | H02J 7/0021 |
| 9,892,787 B2* | 2/2018 | Chen ...................... | G11C 16/26 |
| 10,879,706 B2* | 12/2020 | Wang .................... | H02J 7/0019 |
| 10,978,885 B2* | 4/2021 | Yan ....................... | H02J 7/0014 |
| 2005/0140336 A1* | 6/2005 | Anzawa ................ | H02J 7/0016 |
| | | | 320/118 |
| 2005/0225290 A1* | 10/2005 | Hashimoto ........... | H02J 7/0021 |
| | | | 320/116 |
| 2007/0063673 A1* | 3/2007 | DeHaan ................ | H02J 7/0016 |
| | | | 320/118 |
| 2008/0018300 A1* | 1/2008 | Zaag ....................... | B60L 58/14 |
| | | | 320/118 |
| 2008/0197805 A1* | 8/2008 | Pellenc ............... | H01M 10/441 |
| | | | 320/116 |

(Continued)

*Primary Examiner* — John T Trischler
(74) *Attorney, Agent, or Firm* — Perkins Coie LLP

(57) ABSTRACT

A battery charging and balancing circuit, for charging a battery pack having a plurality of cells. The battery charging and balancing circuit having a detecting circuit to provide a balancing connection indicating signal; a charging circuit to charge the battery pack based on the cell voltages when the balancing connection indicating signal is valid, and to charge the battery voltage otherwise; and a balancing circuit to control the discharging switches coupled with the cells based on the cell voltages when the balancing connection indicating signal is valid.

20 Claims, 8 Drawing Sheets

(56) References Cited

U.S. PATENT DOCUMENTS

| | | | | |
|---|---|---|---|---|
| 2009/0015206 A1* | 1/2009 | Seman, Jr. | H01M 10/425 | 320/134 |
| 2009/0039830 A1* | 2/2009 | Pellenc | H02J 7/0021 | 320/116 |
| 2009/0309545 A1* | 12/2009 | Kunimitsu | G01R 31/396 | 320/118 |
| 2010/0194339 A1* | 8/2010 | Yang | H02J 7/0016 | 320/116 |
| 2011/0234122 A1* | 9/2011 | Yu | H05B 45/46 | 315/297 |
| 2011/0235224 A1* | 9/2011 | Kashima | H02J 7/0016 | 361/62 |
| 2012/0007559 A1* | 1/2012 | Schwartz | H02J 7/0016 | 320/119 |
| 2012/0139553 A1* | 6/2012 | Nortman | G01R 31/382 | 324/537 |
| 2012/0212182 A1 | 8/2012 | Li | | |
| 2013/0057293 A1* | 3/2013 | Miyamoto | G01R 31/396 | 324/433 |
| 2013/0110430 A1* | 5/2013 | Nishi | H01M 10/48 | 702/63 |
| 2013/0249490 A1* | 9/2013 | Umemoto | G01R 31/367 | 320/118 |
| 2013/0320914 A1 | 12/2013 | Li | | |
| 2014/0152261 A1* | 6/2014 | Yamauchi | G01R 31/396 | 320/118 |
| 2015/0035495 A1* | 2/2015 | Yoshida | G01R 31/382 | 320/134 |
| 2015/0229154 A1* | 8/2015 | Kaita | H02J 7/0031 | 320/118 |
| 2016/0233696 A1* | 8/2016 | Mei | H02J 7/0047 | |
| 2017/0287559 A1* | 10/2017 | Chen | G11C 16/14 | |
| 2020/0021118 A1* | 1/2020 | Wang | H02J 7/0024 | |
| 2020/0153262 A1* | 5/2020 | Yoon | H01M 10/441 | |
| 2021/0159710 A1* | 5/2021 | Furukawa | H02J 7/0016 | |
| 2021/0234378 A1* | 7/2021 | Nakayama | H02J 7/0016 | |

* cited by examiner

BATTERY CHARGING SYSTEM AND A METHOD THEREOF

CROSS-REFERENCE TO RELATED APPLICATIONS

This application claims priority to and the benefit of Chinese Patent Application No. 201811030376.1, filed on Sep. 5, 2018, which is incorporated herein by reference in its entirety.

FIELD

The present disclosure relates generally to electronic circuits, and more particularly but not exclusively to chargers.

BACKGROUND

In a conventional battery charging system, the charging circuit and the balancing circuit are separated in independent chips. The charging circuit controls the charging voltage and the charging current provided to the battery pack, while the balancing circuit provides cell measurement and cell balance. However, the charging circuit and the balancing circuit for battery pack with multiple cells are usually independent, which cannot control the battery pack flexibly and efficiently.

FIG. 1 schematically shows a workflow of a prior art charging circuit and a prior art balancing circuit. In FIG. 1, the balancing circuit will measure the power of each cell. Once a voltage Vbatt of a cell reaches a first threshold Vt1, the balancing circuit will subtract a detected minimum cell voltage Vmin of the cell voltages from the voltage Vbatt, and then compare the difference value Vbattd=Vbatt−Vmin with a second threshold Vt2. Once the difference value Vbattd is lower than the second threshold Vt2, the cell with the voltage Vbatt will be discharged, so that to realize cell balance of the pack.

However, the battery charging system always has over voltage protection. Once a cell voltage reaches an over voltage threshold Vovp, the over voltage protection will be triggered, and the charging process will stop. If a difference voltage Vbattd between the over-voltage cell and the minimum voltage cell is less than the second threshold Vt2, the over voltage protection will be triggered before the over-voltage cell is discharged, which means the charging process can only start again when the voltage of the over-voltage cell is self-discharged below the over voltage threshold Vovp. Once the charging process starts again, the voltages of the cells will rise, and the over voltage protection will be triggered again to stop the charging process. Obviously, the charging process will be very long to make sure all the cells in the battery pack are fully charged. Meanwhile, frequently triggering the over voltage protection is harmful to the battery pack. Furthermore, the charging process will stop when the voltage of the battery pack reaches a voltage stop threshold and the charging current reaches a current stop threshold. However, at this time, the cell balance could be actually unfinished. The unbalance situation of the battery pack will hurt the battery performance and shorten the battery life.

Thus, it is necessary to provide a smart and high efficiency charging and balancing solution for the battery pack.

SUMMARY

It is an object of the present invention to disclose a battery charging and balancing system and method with high efficiency, relatively short, smart and safe charging process, to prolong the battery life.

In accomplishing the above and other objects, there has been provided, in accordance with an embodiment of the present invention, a battery charging and balancing circuit, for charging a battery pack having a plurality of battery cells, the battery charging and balancing circuit comprising: a detecting circuit, configured to receive a ground threshold, wherein the detecting circuit has a plurality of cell voltage detecting pins, and each one of the plurality of cell voltage detecting pins is coupled to an associated connection node between two adjacent battery cells of the plurality of battery cells when the battery charging and balancing circuit works in a cell-balancing mode, and wherein the detecting circuit provides a balancing connection indicating signal based on comparison results of the ground threshold with a voltage at each cell voltage detecting pin of the plurality of cell voltage detecting pins, and wherein the balancing connection indicating signal is valid only when the voltage at each cell voltage detecting pin of the plurality of cell voltage detecting pins is higher than the ground threshold; a charging circuit, configured to receive the balancing connection indicating signal, the voltage at each cell voltage detecting pin of the plurality of cell voltage detecting pins, a cell voltage of each battery cell of the plurality of battery cells and a battery voltage of the battery pack, wherein when the balancing connection indicating signal is valid, the charging circuit provides a charging current to the battery pack based on the cell voltage of each battery cell of the plurality of battery cells, and when the balancing connection indicating signal is invalid, the charging circuit provides the charging current to the battery pack based on the battery voltage; and a balancing circuit, configured to receive the balancing connection indicating signal and the cell voltage of each battery cell of the plurality of battery cells, wherein when the balancing connection indicating signal is valid, the balancing circuit provides a plurality of control signals based on the cell voltage of each battery cell of the plurality of battery cells, and wherein each one of the plurality of control signals is provided to an associated discharging switch of a plurality of discharging switches, wherein each one of the plurality of discharging switches is coupled to the associated battery cell of the plurality of battery cells.

In accomplishing the above and other objects, there has been provided, in accordance with an embodiment of the present invention, a control method of a battery charging and balancing system for charging a battery pack with a plurality of cells, comprising: step A.1: detecting if any voltage at a plurality of cell voltage detecting pins of the battery charging and balancing system respectively coupled to an associated connection node between two adjacent battery cells of the plurality battery cells is higher than a ground threshold, if yes, enter into a cell-balancing mode, otherwise, enter into an unbalancing mode; when in cell-balancing mode: step A.2: charging the battery pack based on a cell voltage of each battery cell of the plurality of battery cells; step A.3: monitoring if any cell voltage of the plurality of battery cells is higher than a first balance enable threshold, if yes, enabling the balance function and keeping charging the battery pack, if no, keeping charging the battery pack; step A.4: monitoring if any cell voltage of the plurality of battery cells meets a condition that a difference between the cell voltage and a minimum cell voltage is higher than a second balance enable threshold, if yes, performing a balance process for a preset time period, if no, go to step A.6; step A.5: determining if the balance process is completed, if yes, go to step A.6, if no, go to step A.4; step A.6: determining if a charge-complete condition is met, if yes, stop charging, if no, go to step A.2; when in the unbalancing mode: step A.7: charging the battery pack based on a battery voltage of the battery pack; step A.8: determining if the charge-complete condition is met, if yes, stop charging, if no, go to step A.7; wherein through the whole charging and balancing process, charging the battery pack continues until the charge-complete condition is met.

In accomplishing the above and other objects, there has been provided, in accordance with an embodiment of the present invention, a battery system comprising: a battery pack having a plurality of battery cells coupled in series; a detecting circuit, configured to receive a ground threshold, wherein the detecting circuit has a plurality of cell voltage detecting pins, and each one of the plurality of cell voltage detecting pins is coupled to an associated connection node between two adjacent battery cells of the plurality of battery cells when the battery system works in a cell-balancing mode, and wherein the detecting circuit provides a balancing connection indicating signal based on comparison results of the ground threshold with a voltage at each cell voltage detecting pin of the plurality of cell voltage detecting pins, and wherein the balancing connection indicating signal is valid only when the voltage at each cell voltage detecting pins of the plurality of cell voltage detecting pin is higher than the ground threshold; a charging circuit, configured to receive the balancing connection indicating signal, the voltage at each cell voltage detecting pin of the plurality of cell voltage detecting pins, a cell voltage of each battery cell of the plurality of battery cells and a battery voltage of the battery pack, wherein when the balancing connection indicating signal is valid, the charging circuit provides a charging current to a battery pack based on the cell voltage of each battery cell of the plurality of battery cells, and when the balancing connection indicating signal is invalid, the charging circuit provides the charging current to the battery pack based on the battery voltage; and a balancing circuit, configured to receive the balancing connection indicating signal and the cell voltage of each battery cell of the plurality of battery cells, wherein when the balancing connection indicating signal is valid, the balancing circuit provides a plurality of control signals based on the cell voltage of each battery cell of the plurality of battery cells, and wherein each one of the plurality of control signals is provided to an associated discharging switch of a plurality of discharging switches, wherein each one of the plurality of discharging switches is coupled to the associated battery cell of the plurality of battery cells.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
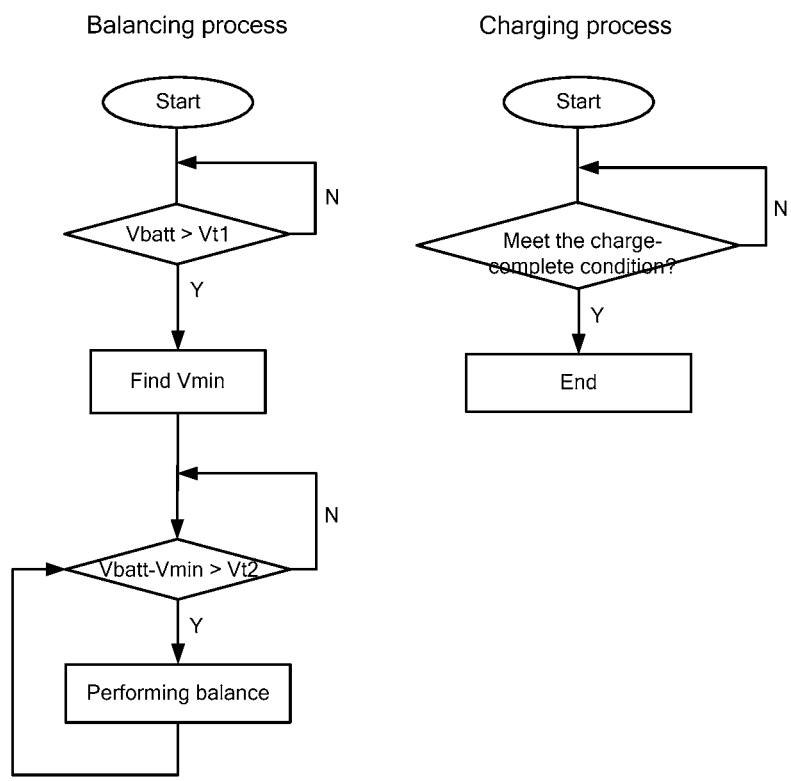
FIG. 1 schematically shows a work flow of a prior art charging circuit and balancing circuit.
Figure 2:
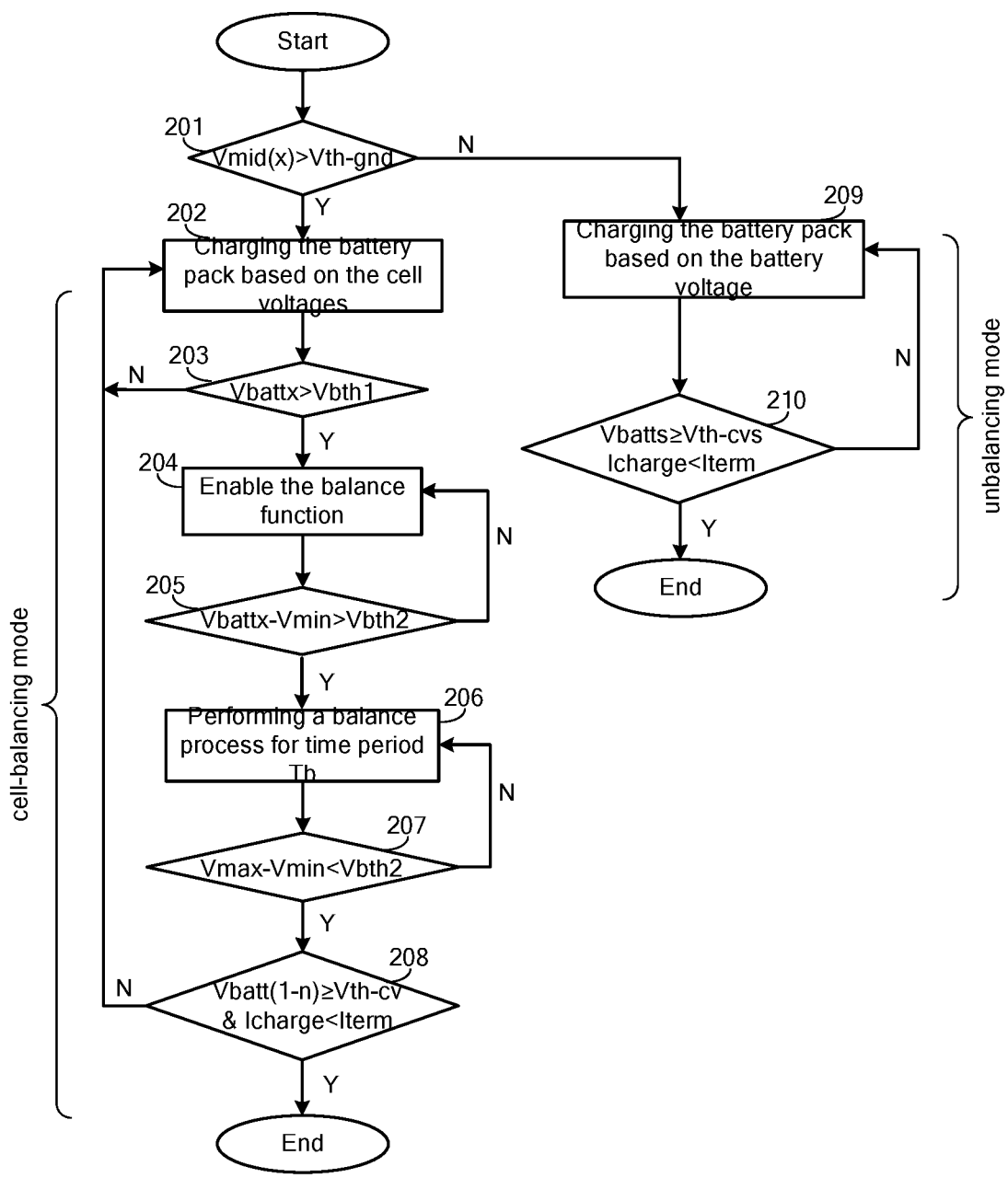
FIG. 2 schematically shows a flow chart of a battery charging and balancing method 20 in accordance with an embodiment of the present invention.

FIG. 2 schematically shows a flow chart of a battery charging and balancing method 20 in accordance with an embodiment of the present invention. The battery charging and balancing method 20 could be used with a battery pack with at least one battery cell, wherein each battery cell is paralleled with a discharging switch.

As shown in FIG. 2, the battery charging and balancing method 20 comprises: step 201, detecting if any voltage of Vmid(1)~Vmid(n−1) at the plurality of cell voltage detecting pins coupled to an associated connection node between two adjacent battery cells of the plurality battery cells is higher than a ground threshold Vth-gnd, if Yes, enter into a cell-balancing mode, otherwise, enter into an unbalancing mode.

When in a cell-balancing mode: step 202, charging the battery pack based on a cell voltage of each battery cell of the plurality of battery cells Batt1~Battn; step 203, monitoring if any cell voltage Vbattx of the plurality of battery cells Batt1~Battn is higher than a first balance enable threshold Vbth1, if Yes, go to step 204, if No, go to step 202; step 204, enabling the balance function; step 205, monitoring if any cell voltage Vbattx of the plurality of battery cells Batt1~Battn meets a condition that a difference between the cell voltage Vbattx of the battery cell Battx and a minimum cell voltage Vmin is higher than a second balance enable threshold Vbth2, if Yes, go to step 206, if No, go to step 208; step 206, performing a balance process for a time period Tb; step 207, determining if a balance-complete condition is met, i.e., detecting if a voltage difference between a maximum cell voltage Vmax and the minimum cell voltage Vmin is lower than the second balance enable threshold Vbth2, if Yes, go to step 208, if No, go to step 206; step 208, determining if a charge-complete condition is met, i.e., detecting if the battery voltage Vbatts reaches a battery voltage CV threshold Vth-cvs, and if the charging current Icharge is lower than a charge-complete current threshold Iterm, if Yes, stop charging, if No, go to step 202.

When in an unbalancing mode: step 209, charging the battery pack based on the battery voltage Vbatts of the battery pack; step 210, determining if the charge-complete condition is met, i.e., detecting if the battery voltage Vbatts reaches a battery voltage CV threshold Vth-cvs, and if the charging current Icharge is lower than charge-complete current threshold Iterm, if Yes, stop charging, if No, go to step 209. In this disclosure, Vmid(x) represents any one of the voltages Vmid(1)~Vmid(n−1) respectively at each cell voltage detecting pins. Each cell voltage detecting pin is coupled to an associated connection node between two adjacent battery cells when in cell-balancing mode, and is coupled to ground or is unconnected when in unbalancing mode. Vbattx represents any one of the cell voltage Vbatt1~Vbattn. In this disclosure, 1≤x≤n while n is the total battery cell number in the battery pack.

It should be understood that, the charging process is ongoing from steps 204 to 208, and from steps 209 to 210. The operation specified in steps 204 to 209 illustrates the cell balance process performed to the battery cells in the battery pack.

In one embodiment, step 206 comprises shunting a charging current flowing to the cell which has a cell voltage Vbattx meet the condition: Vbattx−Vmin>Vbth2, wherein Vbth2 is a second balance enable threshold.

In one embodiment, each one of the voltages Vmid(1) ~Vmid(n−1) refers to a voltage at an associated cell voltage detecting pin of the battery charging and balancing system, wherein each cell voltage detecting pin is connected to the associated connection node between the two adjacent battery cells.

In one embodiment, the ground threshold Vth-gnd equals to zero, or is a little bit higher than zero, e.g., 0.1V. If each of the voltages Vmid(1)~Vmid(n−1) is higher than the ground reference Vth-gnd, it means each one of the connection nodes between two adjacent cells is connected to the associated cell voltage detecting pin of the plurality of cell voltage detecting pins of the battery charging and balancing system. In that case, the battery charging and balancing system will enter into cell-balancing mode. On the contrary, if any one of the cell voltage detecting pins of the battery charging and balancing system is connected to a ground or is unconnected, there would be at least one voltage at the cell voltage detecting pin of the plurality of cell voltage detecting pins is lower than the ground reference Vth-gnd, illustrating that the battery charging and balancing system enters into unbalancing mode.

Figure 3:
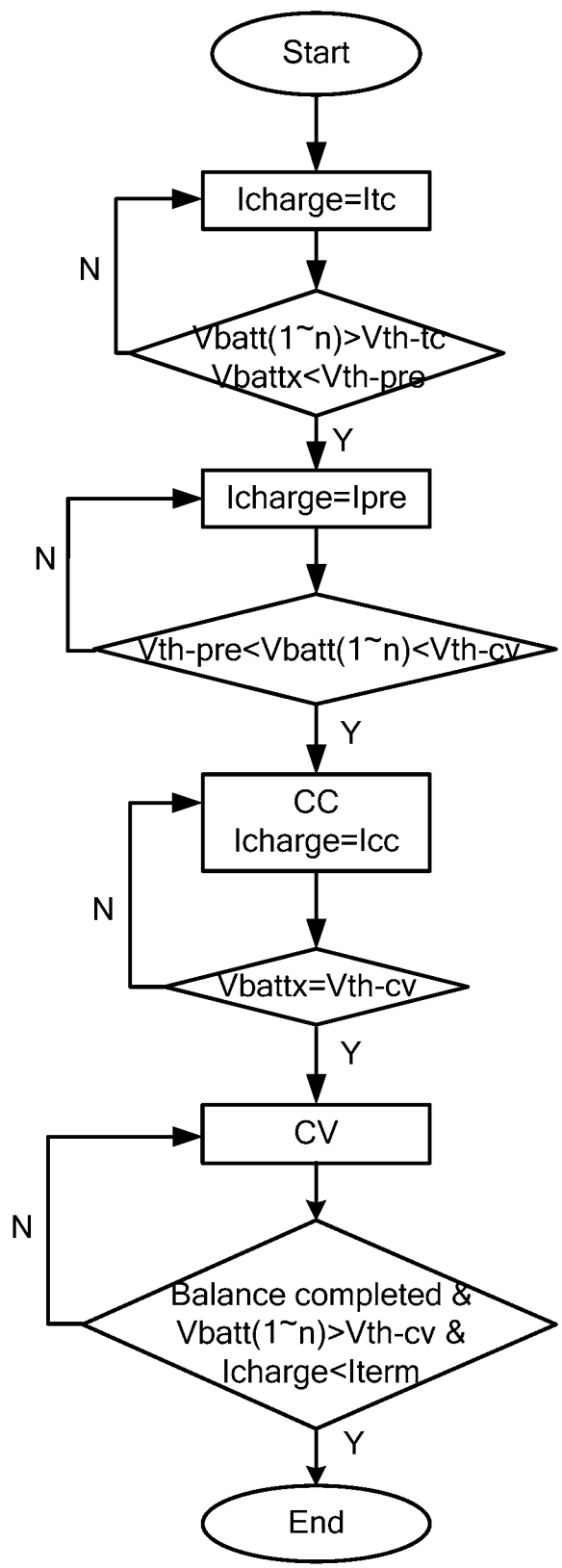
FIG. 3 schematically shows a flow chart of detailed steps of charging the battery pack based on the cell voltages Vbatt1~Vbattn.

FIG. 3 schematically shows a flow chart of detailed steps of charging a battery pack based on the battery cell voltages Vbatt1~Vbattn. In the embodiments of the present invention, the charging process comprises four stages, i.e., TC (Trickle Charge) stage, PRE (Pre-charge) stage, CC (Constant Current) stage and CV (Constant Voltage) stage. The charging current Icharge is in different ranges during different stages. As shown in FIG. 3, during the TC stage, each of the cell voltages Vbatt1~Vbattn is lower than a cell voltage pre-charge threshold Vth-tc, and the charging current Icharge has a TC value Itc; during the PRE stage, each of the cell voltages Vbatt1~Vbattn is higher than the cell voltage pre-charge threshold Vth-tc, but at least one of the cell voltages Vbatt1~Vbattn is lower than a cell voltage CC threshold Vth-pre, and the charging current has a pre-charge value Ipre; during the CC stage, each of the cell voltages Vbatt1~Vbattn is higher than the cell voltage CC threshold Vth-pre, but is lower than a cell voltage CV threshold Vth-cv, and the charging current has a CC value Icc; during the CV stage, at least one of the cell voltage Vbatt1~Vbattn is higher than the cell voltage CV threshold Vth-cv, and the charging current Icharge is decreasing. Once the charging current Icharge decreases to the charge-complete current threshold Iterm, and meanwhile the balance-complete condition is met, the charging process ends.

In one embodiment, the TC value Itc, the pre-charge value Ipre, and the CC value Icc has a relationship of Icc>Ipre>Itc, and the cell voltage pre-charge threshold Vth-tc, the cell voltage CC threshold Vth-pre and the cell voltage CV threshold Vth-cv has a relationship of Vth-cv>Vth-pre>Vth-tc.

Figure 4:
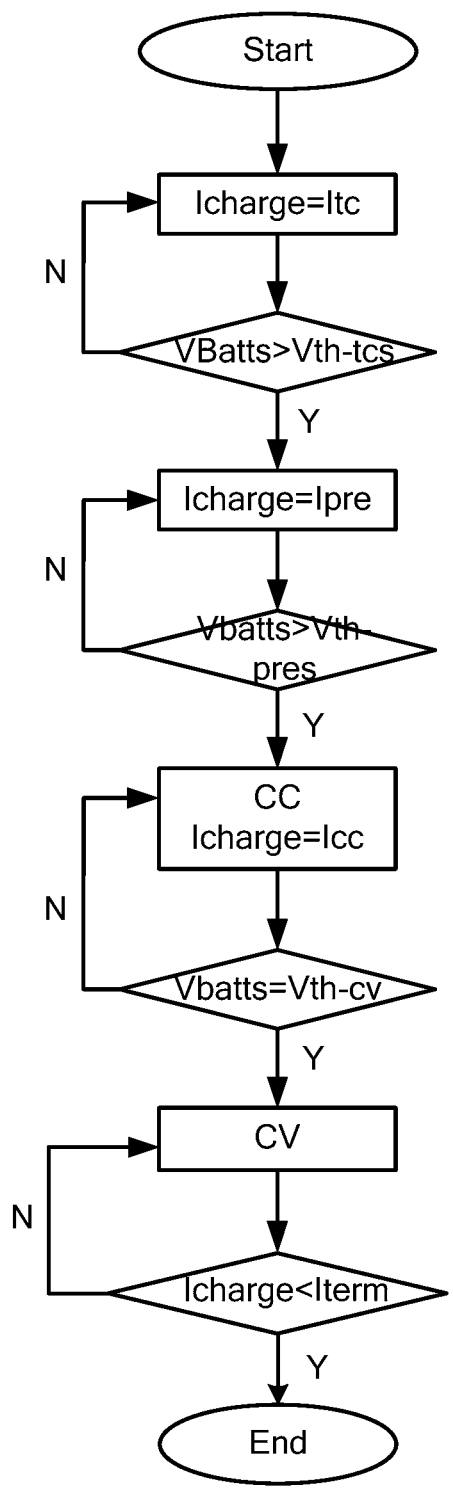
FIG. 4 schematically shows a flow chart of detailed steps of charging the battery pack based on the battery voltage Vbatts.

FIG. 4 schematically shows a flow chart of detailed steps of charging the battery pack based on the battery voltage Vbatts. As described above, the charging process comprises TC stage, PRE stage, CC stage and CV stage. In FIG. 3, the charging current Icharge charges the battery pack based on each cell voltage. Different from the example in FIG. 3, the charging current Icharge in FIG. 4 charges the battery pack based on the battery voltage Vbatts of the battery pack. To be specific, during the TC stage, the battery voltage Vbatts is lower than a battery voltage pre-charge threshold Vth-tcs, and the charging current Icharge has the TC value Itc; during the PRE stage, the battery voltage Vbatts is higher than the battery voltage pre-charge threshold Vth-tcs, but is lower than a battery voltage CC threshold Vth-pres, and the charging current Icharge has the pre-charge value Ipre; during the CC stage, the battery voltage Vbatts is higher than the battery voltage CC threshold Vth-pres, but is lower than a battery voltage CV threshold Vth-cvs, and the charging current Icharge has the CC value Icc; during the CV stage, the battery voltage Vbatts reaches the battery voltage CV threshold Vth-cvs, and the charging current Icharge is decreasing. After the CV stage, once the charging current Icharge decreases to the charge-complete current threshold Iterm, the charging process ends.

In one embodiment, the battery voltage pre-charge threshold Vth-tcs, the battery voltage CC threshold Vth-pres and the battery voltage CV threshold Vth-cvs has a relationship of Vth-cvs>Vth-pres>Vth-tcs.

Figure 5:
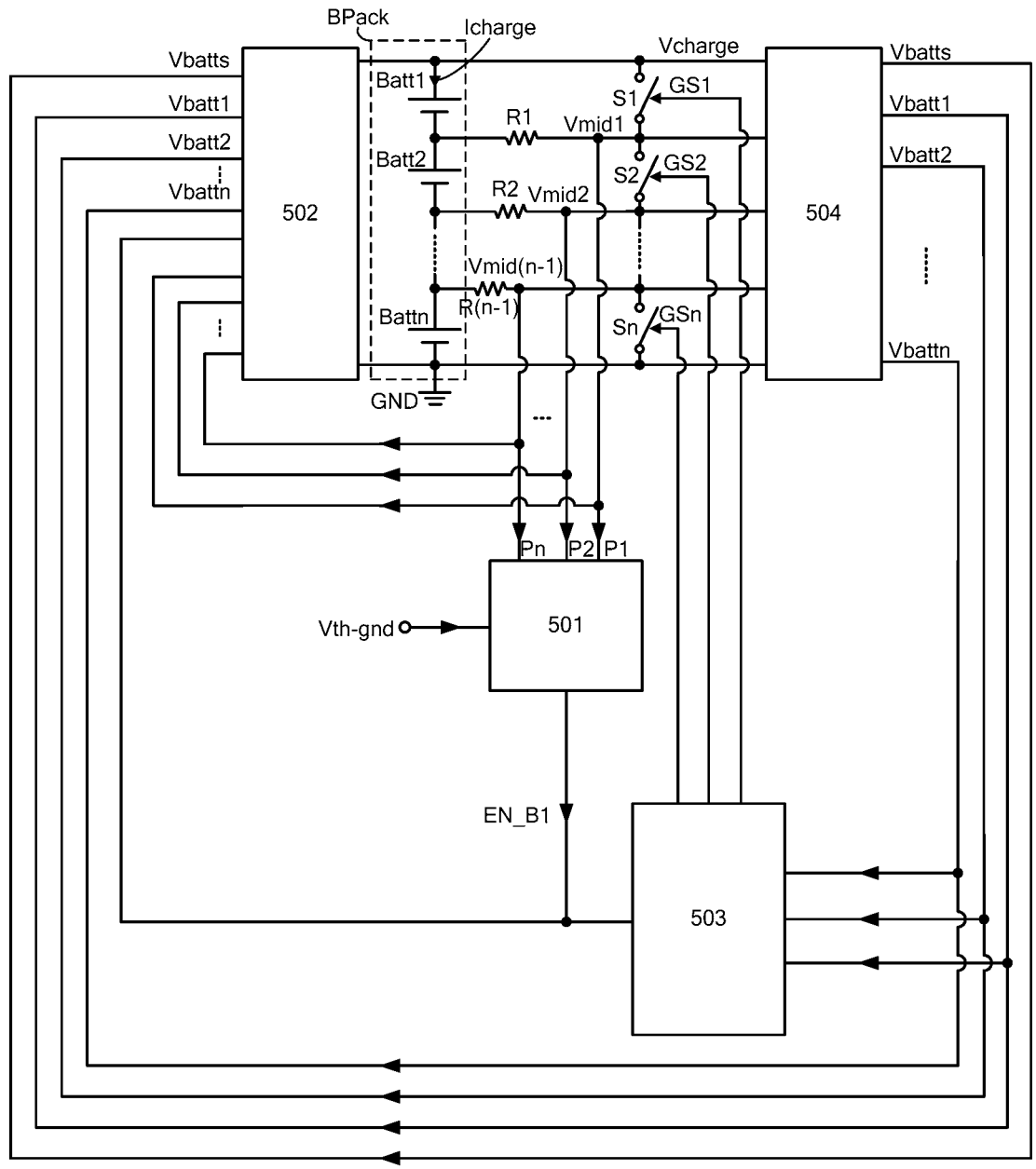
FIG. 5 schematically shows blocks of a battery charging and balancing circuit 50 in accordance with an embodiment of the present invention.

FIG. 5 schematically shows blocks of a battery charging and balancing circuit 50 in accordance with an embodiment of the present disclosure. The battery charging and balancing circuit 50 could charge a battery pack BPack having n battery cells Batt1~Battn as shown in FIG. 5. Each one of the battery cells Batt1~Battn is coupled in parallel with an associated string comprising one of discharging switches S1~Sn, and one of dissipation resistors R1~R(n−1), wherein the associated discharging switch and the associated dissipation resistor are coupled in series. As shown in FIG. 5, the battery charging and balancing circuit 50 comprises: a detecting circuit 501, configured to receive the ground threshold Vth-gnd, wherein the detecting circuit 50 has cell voltage detecting pins P1~Pn, and each one of the cell voltage detecting pins P1~Pn is coupled to the associated connection node between two adjacent battery cells when the battery charging and the balancing circuit 50 works in the cell-balancing mode, and wherein the detecting circuit 501 provides a balancing connection indicating signal EN_B1 based on comparison results of the ground threshold Vth-gnd with each one of the voltages Vmid(1)~Vmid(n−1) at the cell voltage detecting pins, and wherein the balancing connection indicating signal EN_B1 is valid only when each one of the voltages Vmid(1)~Vmid(n−1) is higher than the ground threshold Vth-gnd; a charging circuit 502, configured to receive the balancing connection indicating signal EN_B1, the voltages Vmid(1)~Vmid(n−1), the cell voltage of each battery cell Vbatt1~Vbattn of the plurality of battery cells Batt1~Battn and the battery voltage Vbatts of the battery pack, wherein when the balancing connection indicating signal EN_B1 is valid, the charging circuit 502 provides the charging current Icharge to the battery pack BPack based on the cell voltages Vbatt1~Vbattn, and when the balancing connection indicating signal EN_B1 is invalid, the charging circuit 502 provides the charging current Icharge to the battery pack BPack based on the battery voltage Vbatts; and a balancing circuit 503, configured to receive the balancing connection indicating signal EN_B1 and the cell voltages Vbatt1~Vbattn, wherein when the balancing connection indicating signal EN_B1 is valid, the balancing circuit 503 provides a plurality of control signals GS1~GSn respectively based on the cell voltage of the associated battery cell of the plurality of battery cells Batt1~Battn, and wherein each one of the plurality of control signals is provided to an associated discharging switch Sx coupled with the associated cell Battx. When one of the discharging switch, e.g., S1, is closed, the cell Batt1 is paralleled with the dissipation resistor R1. Then the dissipation resistor R1 will shunt part of the charging current Icharge, resulting in decreasing of the charging current provided to the cell Batt1, to slow down the voltage increase of the cell Batt1.

When the balancing connection indicating signal EN_B1 is valid, the balancing circuit 503 is enabled to work. When the balancing connection indicating signal EN_B1 is invalid, the balancing circuit 503 is disabled.

In the example of FIG. 5, the charging and balancing circuit 50 further comprises a voltage sensing circuit 504, configured to receive the charging voltage Vcharge and the voltages Vmid(1)~Vmid(n-1), and to provide the battery voltage Vbatts and the cell voltages Vbatt1~Vbattn. In some embodiments, the voltage sensing circuit 504 comprises a plurality of error amplifiers, wherein each one of the error amplifiers provides the associated cell voltage Vbattx by getting an amplified error between the voltages at two terminals of the associated cell. In some embodiments, the voltage sensing circuit 504 further comprises voltage dividers to make the charging voltage Vcharge and the voltages Vmid(1)~Vmid(n-1) within the input range of the post-stage circuits. It should be understood that to be within the input range of the post-stage circuits, the battery voltage Vbatts and the cell voltages Vbatt1~Vbattn mentioned in this disclosure may be in proportional to the real associated voltages, and are not necessary to be the exact value of the real associated voltages.

For brevity, the operation of blocks in the charging and balancing circuit 50 will be illustrated with an example application of charging a battery pack with two cells.

Figure 6:
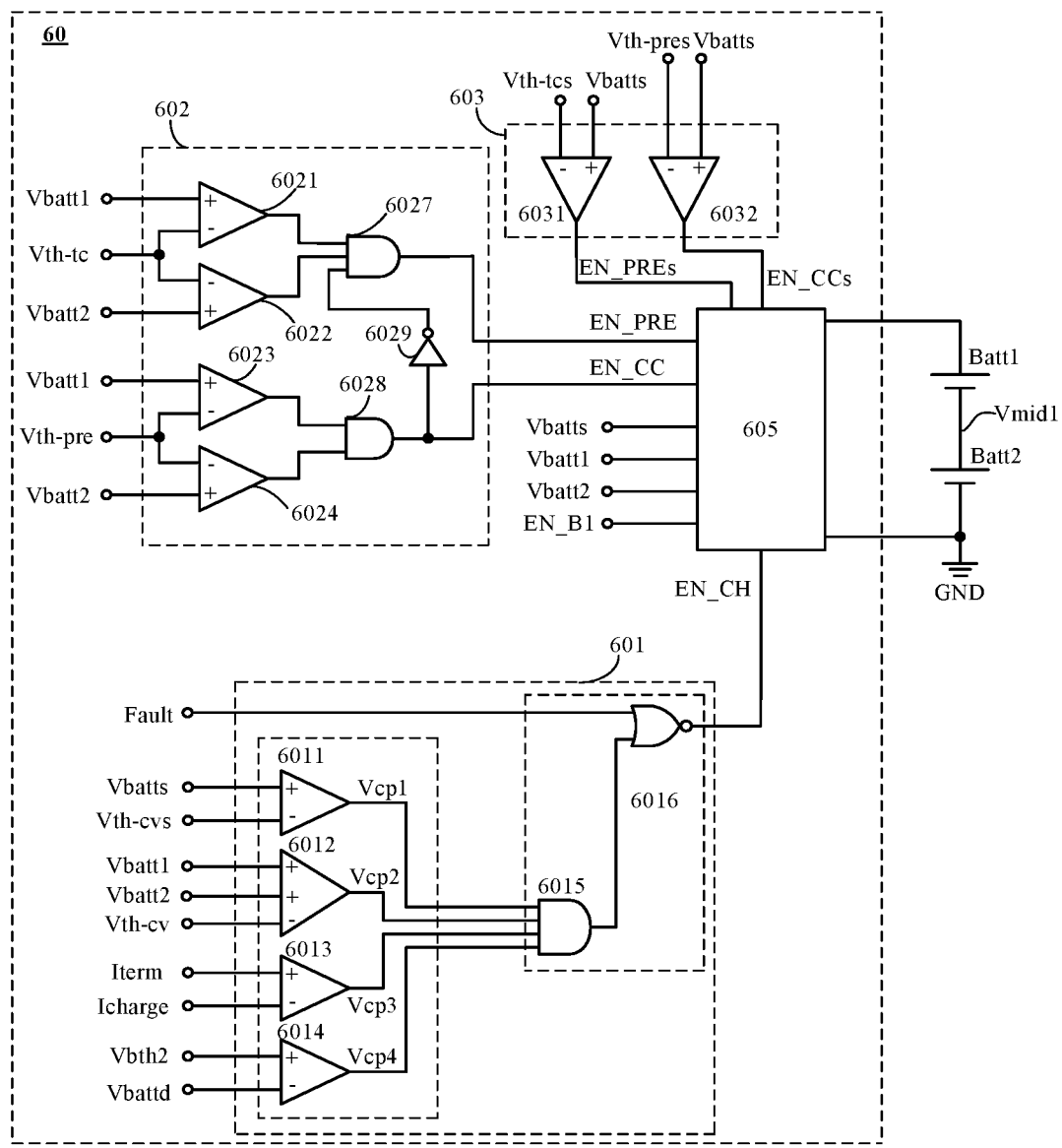
FIG. 6 schematically shows a battery charging and balancing circuit 60 in accordance with an embodiment of the present invention.

FIG. 6 schematically shows a battery charging and balancing circuit 60 in accordance with an embodiment of the present invention. The operation of the battery charging and balancing circuit 60 is illustrated with the application of charging a battery pack having two cells Batt1 and Batt2. As shown in FIG. 6, the battery charging and balancing circuit 60 comprises: a charging enable circuit 601, providing a charging enable signal EN_CH based on a fault signal Fault, the battery voltage Vbatts, the cell voltages Vbatt1, Vbatt2, the difference voltage Vbattd representing a difference between the cell voltages Vbatt1 and Vbatt2, the charging current Icharge, the battery voltage CV threshold Vth-cvs, the cell voltage CV threshold Vth-cv, the charge-complete current threshold Iterm and the second balance enable threshold Vbth2; a cell-balancing mode current selecting circuit 602, configured to provide a cell-balancing mode pre-charge enable signal EN_PRE based on comparison results of the cell voltage pre-charge threshold Vth-tc with each one of the cell voltages Vbatt1, Vbatt2, and to provide a cell-balancing mode CC enable signal EN_CC based on comparison results of the cell voltage CC threshold Vth-pre with each one of the cell voltages Vbatt1, Vbatt2, wherein when any one of the cell voltages Vbatt1, Vbatt2 is lower than the cell voltage pre-charge threshold Vth-tc, both of the cell-balancing mode pre-charge enable signal EN_PRE and the cell-balancing mode CC enable signal EN_CC are invalid, when both of the cell voltages Vbatt1~Vbatt2 are higher than the cell voltage pre-charge threshold Vth-tc, and at least one of the cell voltages Vbatt1~Vbatt2 is lower than the cell voltage CC threshold Vth-pre, the cell-balancing mode pre-charge enable signal EN_PRE is valid and the cell-balancing mode CC enable signal EN_CC is invalid, when both of the cell voltages Vbatt1~Vbatt2 are higher than the cell voltage CC threshold Vth-pre, the cell-balancing mode CC enable signal EN_CC is valid and the cell-balancing mode pre-charge enable signal EN_PRE is invalid; an unbalancing mode current selecting circuit 603, configured to provide an unbalancing mode pre-charge enable signal EN_PREs based on a comparison result of the battery voltage Vbatts with the cell voltage pre-charge threshold Vth-tc, and to provide an unbalancing mode CC enable signal EN_CCs based on a comparison result of the battery voltage Vbatts with the battery voltage CC threshold Vth-pres, wherein when the battery voltage Vbatts is lower than the battery voltage pre-charge threshold Vth-tcs, both of the unbalancing mode pre-charge enable signal EN_PREs and the unbalancing mode CC enable signal EN_CCs are invalid, when the battery voltage Vbatts is higher than the battery voltage pre-charge threshold Vth-tcs, but is lower than the battery voltage CC threshold Vth-pres, the unbalancing mode pre-charge enable signal EN_PREs is valid and the unbalancing mode CC enable signal EN_CCs is invalid, when the battery voltage Vbatts is higher than the battery voltage CC threshold Vth-pres, the unbalancing mode CC enable signal EN_CCs is valid and the unbalancing mode pre-charge enable signal EN_PREs is invalid; and a current regulating circuit 605, configured to provide the charging current Icharge based on the balancing connection indicating signal EN_B1, the charging enable signal EN_CH, the cell-balancing mode pre-charge enable signal EN_PRE, the cell-balancing mode CC enable signal EN_CC, the unbalancing mode pre-charge enable signal EN_PREs, the unbalancing mode CC enable signal EN_CCs, the battery voltage Vbatts, and the cell voltages Vbatt1 and Vbatt2, wherein when the charging enable signal EN_CH is valid, the charging current Icharge has a value determined by different enable signals, i.e., the charging current Icharge has a TC value Itc when the cell-balancing mode pre-charge enable signal EN_PRE, the unbalancing mode pre-charge enable signal EN_PREs, the cell-balancing mode CC enable signal EN_CC, and the unbalancing mode CC enable signal EN_CCs are invalid, the charging current Icharge has a pre-charge value Ipre when the cell-balancing mode pre-charge enable signal EN_PRE or the unbalancing mode pre-charge enable signal EN_PREs is valid, and the charging current Icharge has a CC value Icc when the cell-balancing mode CC enable signal EN_CC or the unbalancing mode CC enable signal EN_CCs is valid.

The current regulating circuit 605 may comprise conventional battery charging circuit with a current loop and a voltage loop. When the charging process begins, the current loops of the current regulating circuit 605 dominates the operation. The charging current Icharge may have a value according to the battery voltage in unbalancing mode, or have a value according to the cell voltage of each battery cell of the plurality of battery cells in cell-balancing mode as illustrated previously. The battery voltage and the cell voltages increases accordingly as the charging current Icharge charges the battery pack.

When the battery charging and balancing circuit 60 works in cell-balancing mode, i.e., the balancing connection indicating signal EN_B1 is valid, the voltage loop dominates the operation once any one of the cell voltages Vbattx reaches the cell voltage CV threshold Vth-cv. Then the charging current Icharge decreases. If the balancing circuit 503 is not enabled, the charging process ends when the charging current Icharge decreases to the charge-complete current threshold Iterm. If the balancing circuit 503 is enabled, the charging current Icharge to the cell with higher voltage will be shunted until the balancing condition is not met any more, and the charging process ends when the charging current Icharge decreases to the charge-complete current threshold Iterm.

When the battery charging and balancing circuit 60 works in unbalancing mode, i.e., the balancing connection indicating signal EN_B1 is invalid, the voltage loop of the current regulating circuit 605 will dominate the operation when the battery voltage Vbatts reaches the battery voltage CV threshold Vth-cvs. Afterwards, the charging current Icharge deceases. The charging process ends when the charging current Icharge decreases to the charge-complete current threshold Iterm.

As can be seen from FIG. 6, the charging enable circuit 601 comprises comparators 6011~6014, and the logic gates 6015~6016. In the example of FIG. 6, the logic gate 6015 comprises an AND gate, and the logic gate 6016 comprises a NOR gate. The comparator 6011 compares the battery voltage Vbatts with the battery voltage CV threshold Vth-cvs. When the battery voltage Vbatts is lower than the battery voltage CV threshold Vth-cvs, the comparator 6011 provides a first comparison signal Vcp1 to valid the charging enable signal EN_CH via the logic gates 6015~6016. The comparator 6012 compares both of the cell voltages Vbatt1 and Vbatt2 with the cell voltage CV threshold Vth-cv. When both of the cell voltages Vbatt1 and Vbatt2 are higher than the cell voltage CV threshold Vth-cv, the comparator 6012 provides a second comparison signal Vcp2 to invalid the charging enable signal EN_CH via the logic gates 6015 and 6016. The comparator 6013 compares the charging current Icharge with the charge-complete current threshold Iterm. When the charging current Icharge is higher than the charge-complete current threshold Iterm, the comparator 6013 provides a third comparison signal Vcp to valid the charging enable signal EN_CH via the logic gates 6015 and 6015. The comparator 6014 compares the difference voltage Vbattd with the second balance enable threshold Vbth2. When the difference voltage Vbattd is higher than the Vbth2, the comparator 6014 provides a fourth comparison signal Vcp4 to valid the charge enable signal EN_CH via the logic gates 6015 and 6016. The fault signal Fault indicates over voltage, over temperature and other fault conditions. When over voltage, over temperature or other error happens, the fault signal Fault in the example of FIG. 6 will be high logic level, and will invalid the charging enable signal EN_CH via the logic gate 6015, to stop the charging process. In conclusion, the battery will be charged when the fault signal Fault indicates no error, and meanwhile one of the following conditions is met: (1) the battery voltage Vbatts is under the battery voltage CV threshold Vth-cvs (the charging process in unbalancing mode is not completed), (2) the cell voltages Vbatt1 and Vbatt2 are under the cell voltage CV threshold Vth-cv (the charging process in cell-balancing mode is not completed), (3) the charging current Icharge is higher than the charge-complete current threshold Iterm (the charging process is not completed), (4) the difference voltage Vbattd is higher than the second balance enable signal Vbth2 (the balancing process is not completed).

In the example of FIG. 6, the cell-balancing mode current selecting circuit 602 comprises comparators 6021~6024 and AND gates 6027~6029. The comparator 6021 provides an output signal based on a comparison result of the cell voltage Vbatt1 and the cell voltage pre-charge threshold Vth-tc, wherein the output signal of the comparator 6021 has a high level voltage when the cell voltage Vbatt1 is higher than the cell voltage pre-charge threshold Vth-tc, and has a low level voltage otherwise. The comparator 6022 provides an output signal based on a comparison result of the cell voltage Vbatt2 and the cell voltage pre-charge threshold Vth-tc, wherein the output signal of the comparator 6022 has a high level voltage when the cell voltage Vbatt2 is higher than the cell voltage pre-charge threshold Vth-tc, and has a low level voltage otherwise. When both of the output signals of the comparators 6021 and 6022 have high level voltages, and meanwhile the cell-balancing mode CC enable signal EN_CC has a low voltage level, the AND gate 6027 provides the cell-balancing mode pre-charge enable signal EN_PRE with a high voltage level, i.e., the cell-balancing mode pre-charge enable signal EN_PRE is valid, otherwise, the cell-balancing mode pre-charge enable signal EN_PRE has a low level voltage, i.e., is invalid. The cell-balancing mode CC enable signal EN_CC is generated in the similar way of generating the cell-balancing mode pre-charge enable signal EN_PRE, and is not described here for brevity.

In the example of FIG. 6, the unbalancing mode current selecting circuit 603 comprises comparators 6031~6032. The comparator 6031 provides the unbalancing mode pre-charge enable signal EN_PREs based on a comparison result of the battery voltage Vbatts and the battery voltage pre-charge threshold Vth-tcs, wherein the unbalancing mode pre-charge enable signal EN_PREs has a high level voltage when the battery voltage Vbatts is higher than the battery voltage pre-charge threshold Vth-tcs, and has a low level voltage otherwise. In the example of FIG. 6, the unbalancing mode pre-charge enable signal EN_PREs is valid when having the high level voltage. The unbalancing mode CC enable signal EN_CCs is generated in the similar way with generating the unbalancing mode pre-charge enable signal EN_PREs, and is not described here for brevity.

It should be understood that the signals of the cell-balancing mode current selecting circuit 602 and the unbalancing mode current selecting circuit 603 described above are for illustration. The signals in different applications may have different forms to represent its valid/invalid state. When the forms of the signals in different applications vary, the logic gates in the circuits 602 and 603 will change accordingly.

The current regulating circuit 605 receives the charging enable signal EN_CH, the cell-balancing mode pre-charge enable signal EN_PRE, the cell-balancing mode CC enable signal EN_CC, the unbalancing mode pre-charge enable signal EN_PREs and the unbalancing mode CC enable signal EN_CCs. The current regulating circuit 605 provides the charging current Icharge to the battery pack BPack when the charging enable signal EN_CH is valid. The value of the charging current Icharge is decided by the cell-balancing mode pre-charge enable signal EN_PRE, the cell-balancing mode CC enable signal EN_CC, the unbalancing mode pre-charge enable signal EN_PREs and the unbalancing mode CC enable signal EN_CCs. Any circuit regulating the output current based on the input signals could be used with the present invention. In one embodiment, the current regulating circuit 605 receives a current reference signal, and the charging current Icharge provided by the current regulating circuit 605 is determined by the current reference signal, which is controlled by the enables signals EN_PRE, EN_CC, EN_PREs and EN_CCs.

In one embodiment, when the cell-balancing function is enabled, i.e., the balancing connection indicating signal EN_B1 is valid, the priority of the enable signals is: EN_CC>EN_PRE; when the cell-balancing function is disabled, i.e., the balancing connection indicating signal EN_B1 is invalid, the priority of the enable signals is: EN_CCs>EN_PREs. That is to say, when the cell-balancing mode CC enable signal EN_CC or the unbalancing mode CC enable signal EN_CCs is valid, the charging current Icharge has the CC value Icc regardless of the status of the cell-balancing mode pre-charge enable signal EN_PRE and the unbalancing mode pre-charge enable signal EN_PREs; in the premise that the cell-balancing mode CC enable signal EN_CC or the unbalancing mode CC enable signal EN_CCs is invalid, the charging current Icharge has the TC value Itc when the cell-balancing mode pre-charge enable signal EN_PRE or the unbalancing mode pre-charge enable signal EN_PREs is invalid, and has the pre-charge value Ipre when the cell-balancing mode pre-charge enable signal EN_PRE or the unbalancing mode pre-charge enable signal EN_PREs is valid.

The value of the charging current Icharge could be changed by changing a value of the current reference signal. There are multiple ways to adjust the value of the current reference signal based on the enable signals. In one embodiment, a selecting circuit may provide a current reference signal with different values based on the state of each enable signal. In another embodiment, a current mirror circuit may provide different currents to a resistor to build up different current reference signals, while the current provided to the resistor is determined by the state (valid or invalid) of each enable signal.

FIG. 6 schematically shows the battery charging and balancing circuit applied to the battery pack with two battery cells. It should be understood that when the battery charging and balancing circuit of the present invention is applied with a battery pack having more than two battery cells, the numbers of the comparators in the charging enable circuit 601, the cell-balancing mode current selecting circuit 602 and the unbalancing mode current selecting circuit 603 will increase. For example, if the battery pack has n battery, wherein n≥2, and the charging current Icharge has m different values, wherein m>1, then the number of the comparators in the cell-balancing mode current selecting circuit 602 will be n×(m−1), and the number of the comparators in the unbalancing mode current selecting circuit 603 will be m−1.

Figure 7:
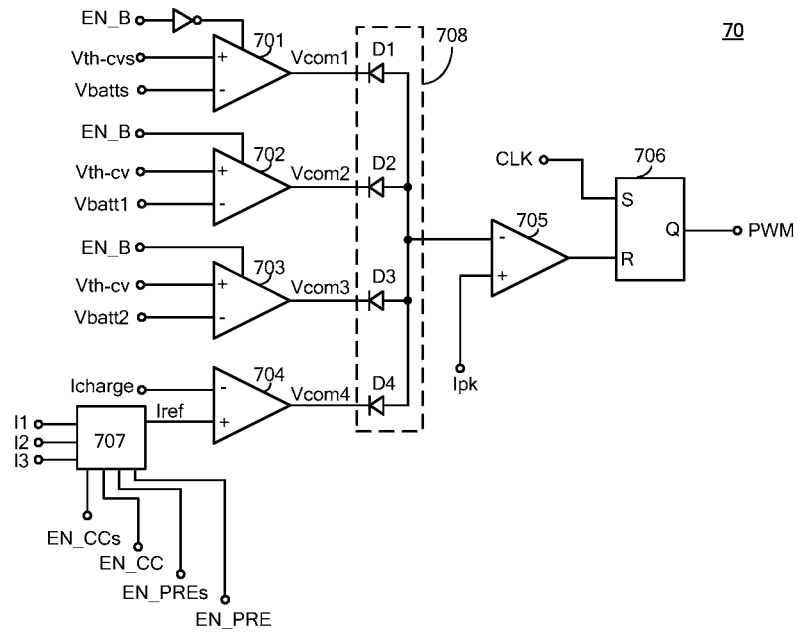
FIG. 7 schematically shows a current regulating circuit 70 in accordance with an embodiment of the present invention.

FIG. 7 schematically shows a current regulating circuit 70 in accordance with an embodiment of the present invention. As shown in FIG. 7, the current regulating circuit 70 comprises error amplifiers 701~704, a comparator 705 and a RS flip-flop 706. Take the operation of the current regulating circuit 70 under unbalancing mode as an example, in each switching cycle, the RS flip-flop 706 is set by a clock signal CLK to provide a switching signal PWM to turn on a power switch (not shown in FIG. 7), as a result, power is drawn from a power source to a load, i.e., the battery pack, via the power switch. The error amplifier 701 receives the battery voltage Vbatts and the battery voltage CC threshold Vth-cvs, and provides an amplified error signal Vcom1 based on the battery voltage Vbatts and the battery voltage CC threshold Vth-cvs. When the battery voltage Vbatts increases, the amplified error signal Vcom1 decreases. Once a value of the amplified error signal Vcom1 decreases to a peak current Ipk of an inductor of the current regulating circuit 70, the comparator 705 flips and provides an output signal to reset the RS flip-flop 706. Then the switching signal PWM turns off the power switch until the clock signal CLK sets the RS flip-flop 706 again. The on and off of the power switch determines the power delivered to the battery pack. The balancing connection indicating signal EN_B1 determines which voltage (the battery voltage or the cell voltage) participates the voltage loop control. For example, if the balancing connection indicating signal EN_B1 is valid, the error amplifiers 702 and 703 respectively receiving cell voltages Vbatt1 and Vbatt2 are enabled, then the cell voltages Vbatt1 and Vbatt2 will participate the voltage loop control of the current control circuit 70. Otherwise, the error amplifier 701 receiving battery voltage is enabled, and the battery voltage Vbatts participates the voltage loop control of the current regulating circuit 70. The swap between the voltage loop and the current loop is determined by the output signal of each one of the error amplifiers 701~704. The output signal of one of the error amplifiers 701~704 with the minimum value will be selected by the minimum value selecting circuit 708 to participate in the loop control. In the example of FIG. 7, the minimum value selecting circuit 708 is implemented by diodes D1~D4.

It should be understood that, the current regulating circuit 70 in FIG. 7 is for illustration. Any current regulating circuit with voltage loop and current loop could be used with the present invention.

Figure 8:
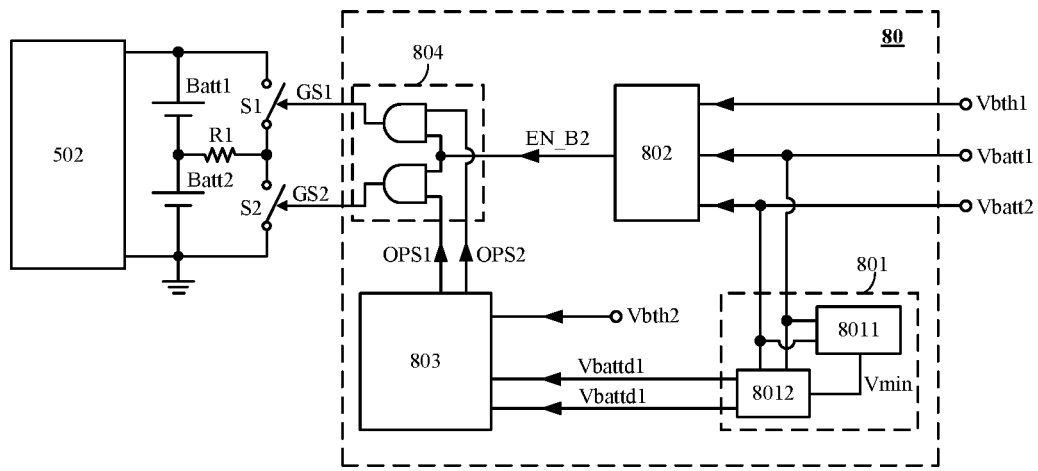
FIG. 8 schematically shows a balancing circuit 80 in accordance with an embodiment of the present invention.

FIG. 8 schematically shows a balancing circuit 80 in accordance with an embodiment of the present invention. As shown in FIG. 8, the balancing circuit 80 comprises: a calculating circuit 801, configured to receive the cell voltages Vbatt1~Vbatt2, and to provide a difference voltage Vbattd1 representing a difference between the cell voltage Vbatt1 and the minimum cell voltage Vmin, and a difference voltage Vbattd2 representing a difference between the cell voltage Vbatt2 and the minimum cell voltage Vmin; a balance enable circuit 802, configured to provide a balance enable signal EN_B2 based on a comparison result of the cell voltage Vbatt1 and the first balance enable threshold Vbth1, and a comparison result of the cell voltage Vbatt2 and the first balance enable threshold Vbth1; a difference voltage comparison circuit 803, configured to provide pre-control signals OPS1~OPS2 based on a comparison result of the difference voltage Vbattd1 and the second balance enable threshold Vbth2, and a comparison result of the difference voltage Vbattd2 and the second balance enable threshold Vbth2, wherein when any one of the difference voltages Vbattd1 and Vbattd2 is higher than the second balance enable threshold Vbth2, the corresponding pre-control signal OPSx is valid; and a logic circuit 804, configured to provide the control signals GS1~GS2 based on the pre-control signals OPS1~OPS2 and the balance enable signal EN_B2, wherein when the balance enable signal EN_B2 is valid, the pre-control signals OPS1~OPS2 are respectively provided as the control signals GS1~GS2, and respectively controls the associated discharging switches S1~S2. In the example of FIG. 8, x would be 1 or 2. It should be known that when there are n cells in a battery pack, x would be one of 1~n.

In one embodiment, the calculating circuit 801 comprises: a minimum value detecting circuit 8011, configured to receive the cell voltages Vbatt1 and Vbatt2, and to provide one of the cell voltages Vbatt1 and Vbatt2 with the minimum value as the minimum cell voltage Vmin; and a subtracting circuit 8012, configured to receive the cell voltages Vbatt1~Vbatt2 and the minimum cell voltage Vmin, and to provide the difference voltages Vbattd1~Vbattd2 respectively based on the subtraction results of the associated cell voltage Vbatt1/Vbatt2 with the minimum cell voltage Vmin, i.e., Vbattd1=Vbatt1−Vmin, and Vbattd2=Vbatt2−Vmin.

In one embodiment, the balance enable circuit 802 comprises two comparators, respectively comparing each cell voltage with the first balance enable threshold Vbth1, and providing the comparison results. The balance enable circuit 802 further comprises a logic circuit, configured to receive the two comparison results respectively from the two comparators and to provide the balance enable signal EN_B2 based on the comparison results. When any one of the cell voltages Vbatt1 and Vbatt2 is higher than or equal to the first balance enable threshold Vbth1, the balance enable signal EN_B2 is valid. When both of the cell voltages Vbatt1~Vbatt2 are lower than the first balance enable threshold Vbth1, the balance enable signal EN_B2 is invalid. In the example of FIG. 8, there are two battery cells in the battery pack, thus the balance enable circuit 802 comprises two comparators. In applications with more than two cells in the battery pack, the number of the comparators in the balance enable circuit 802 would be the same with the number of the battery cells in the battery pack.

In one embodiment, the difference voltage comparison circuit 803 comprises a plurality of comparators, wherein each comparator compares one of the difference voltage Vbattd1~Vbattd2 with the second balance enable threshold Vbth2, and provides the one of the pre-control signals OPS1~OPS2 based on the associated comparison result. When any one of the difference voltages Vbattd1 and Vbattd2 is higher than the second balance enable threshold Vbth2, which means the difference voltage between the associated cell voltage Vbattx and the minimum cell voltage Vmin is too large that cell balance is needed, the associated pre-control signal OPSx is valid, and turns on the associated discharging switch Sx in the premise that the balance enable signal EN_B2 being valid. As a result, the discharging resistor Rx is paralleled to the corresponding cell Battx, and shunts the charging current Icharge flowing to the associated cell Battx, until the difference voltage Vbattdx of the associated cell voltage Vbattx and the minimum cell voltage Vmin decreases to the second balance enable threshold Vbth2.

In the example of FIG. 8, the logic circuit 804 comprises two AND gates, and each AND gate receives the balance enable signal EN_B2 and one of the pre-control signals OPS1 and OPS2. When the balance enable signal EN_B2 and one of the pre-control signals OPS1, OPS2 are valid, the associated AND gate will provide the associated control signal GSx to turn on the associated discharging switch Sx. It should be understood that the logic circuit 804 may be implemented differently in different applications when the signal forms are changed.

In one embodiment, the first balance enable signal Vbth1 is higher than the second balance enable signal Vbth2. In one embodiment, the rate voltage of each cell in the battery pack is 4.2V, the value of the first balance enable signal Vbth1 is 3.5V, and the value of the second balance enable signal Vbth2 is 50 mV. Persons of ordinary skill in the art could choose the values of the first balance enable signal Vbth1 and the second balance enable signal Vbth2 according to the application in the light of the present invention.

Figure 9:
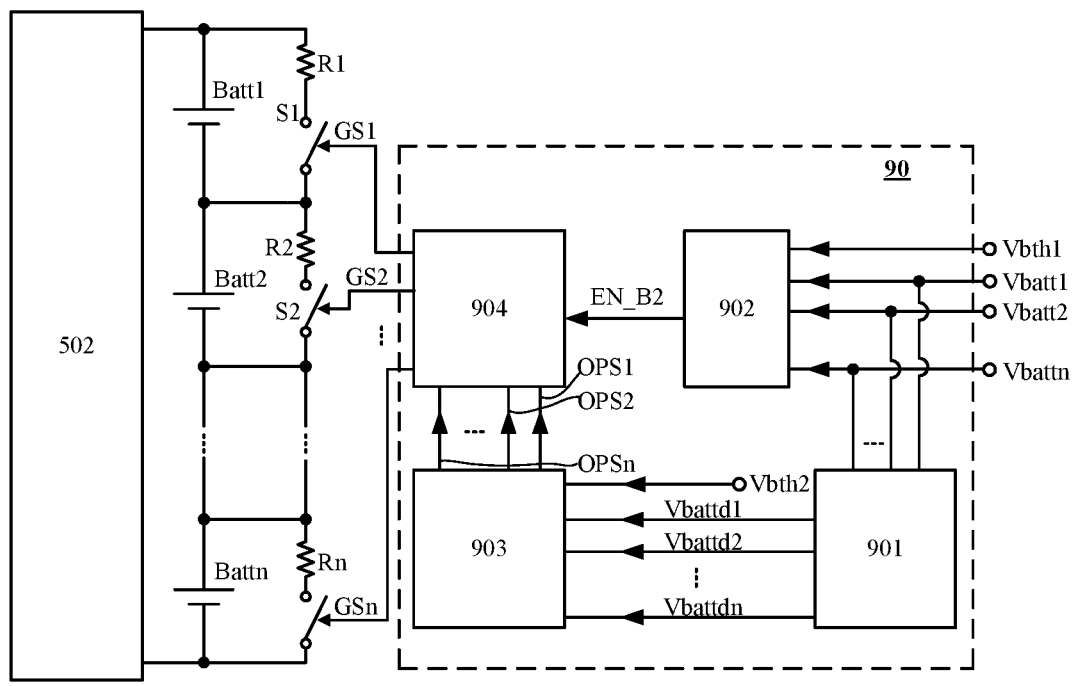
FIG. 9 schematically shows a balancing circuit 90 in accordance with an embodiment of the present invention.

FIG. 9 schematically shows a balancing circuit 90 in accordance with an embodiment of the present invention. Compared with the balancing circuit 80 in FIG. 8, the balancing circuit 90 is adopted to charge a battery pack with n cells, wherein n≥2. As described before, when n>2, the number of the comparators in the corresponding comparison circuits increases. Another difference is that the discharging resistors R1~Rn are respectively coupled in series with the associated one of the discharging switches S1~Sn. It should be understood that both ways of the connection between the each discharging switch and the associated discharging resistor in FIG. 8 and FIG. 9 work with the present invention.

Figure 10:
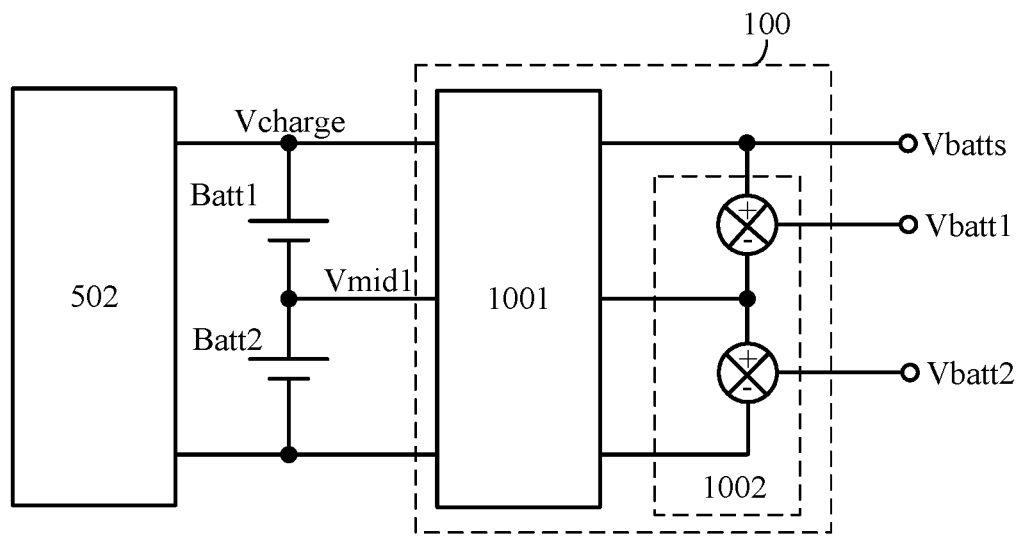
FIG. 10 schematically shows a voltage sensing circuit 100 in accordance with an embodiment of the present invention.

FIG. 10 schematically shows a voltage sensing circuit 100 in accordance with an embodiment of the present invention. The voltage sensing circuit 100 comprises a voltage dividing circuit 1001 and a subtracting circuit 1002. The voltage dividing circuit 1001 receives the charging voltage Vcharge and the voltage Vmid1 ate the cell voltage detecting pin to a connection node of the battery cells Batt1 and Batt2, and provides associated partial voltages to the subtracting circuit 1002. The subtracting circuit 1002 receives each partial voltage from the voltage dividing circuit 1001, and performs calculation on each two partial voltages at two terminals of the associated cell to get each associated representative cell voltage, which is actually in proportional to the corresponding real cell voltage.

In some embodiments, the voltage dividing circuit 1001 could be omitted, as long as the cell voltage of each battery cell of the plurality of battery cells is in the input voltage range of the post-stage circuits.

In some embodiments, the subtracting circuit 1002 is implemented by a plurality of error amplifiers.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A battery charging and balancing circuit, for charging a battery pack having a plurality of battery cells, the battery charging and balancing circuit comprising:
   a detecting circuit, configured to receive a ground threshold, wherein the detecting circuit has a plurality of cell voltage detecting pins, and each one of the plurality of cell voltage detecting pins is coupled to an associated connection node between two adjacent battery cells of the plurality of battery cells when the battery charging and balancing circuit works in a cell-balancing mode, and wherein the detecting circuit provides a balancing connection indicating signal based on comparison results of the ground threshold with a voltage at each cell voltage detecting pin of the plurality of cell voltage detecting pins, and wherein the balancing connection indicating signal is valid only when the voltage at each cell voltage detecting pin of the plurality of cell voltage detecting pins is higher than the ground threshold;

a charging circuit, configured to receive the balancing connection indicating signal, the voltage at each cell voltage detecting pin of the plurality of cell voltage detecting pins, a cell voltage of each battery cell of the plurality of battery cells and a battery voltage of the battery pack, wherein when the balancing connection indicating signal is valid, the charging circuit provides a charging current to the battery pack based on the cell voltage of each battery cell of the plurality of battery cells, and when the balancing connection indicating signal is invalid, the charging circuit provides the charging current to the battery pack based on the battery voltage; and a balancing circuit, configured to receive the balancing connection indicating signal and the cell voltage of each battery cell of the plurality of battery cells, wherein when the balancing connection indicating signal is valid, the balancing circuit provides a plurality of control signals respectively based on the cell voltage of the associated battery cell of the plurality of battery cells, and wherein each one of the plurality of control signals is provided to an associated discharging switch of a plurality of discharging switches, and wherein each one of the plurality of discharging switches is coupled to the associated battery cell of the plurality of battery cells.

2. The battery charging and balancing circuit of claim 1, wherein the charging circuit comprises:

a charging enable circuit, configured to provide a charging enable signal based on a fault signal, the battery voltage, the cell voltage of each battery cell of the plurality of battery cells, a plurality of difference voltages respectively representing a difference between the cell voltage of each battery cell of the plurality of battery cells and a minimum cell voltage, the charging current, a battery voltage CV threshold, a cell voltage CV threshold, a charge-complete current threshold and a second balance enable threshold;

a cell-balancing mode current selecting circuit, configured to provide a cell-balancing mode pre-charge enable signal based on comparison results of a cell voltage pre-charge threshold with the cell voltage of each battery cell of the plurality of battery cells, and to provide a cell-balancing mode CC enable signal based on comparison results of a cell voltage CC threshold with the cell voltage of each battery cell of the plurality of battery cells, wherein when at least one cell voltage of the battery cell of the plurality of battery cells is lower than the cell voltage pre-charge threshold, both of the cell-balancing mode pre-charge enable signal and the cell-balancing mode CC enable signal are invalid, when the cell voltage of each battery cell of the plurality of battery cells is higher than the cell voltage pre-charge threshold, and at least one cell voltage of the battery cell of the plurality of battery cells is lower than the cell voltage CC threshold, the cell-balancing mode pre-charge enable signal is valid and the cell-balancing mode CC enable signal is invalid, when the cell voltage of each battery cell of the plurality of battery cells is higher than the cell voltage CC threshold, the cell-balancing mode CC enable signal is valid and the cell-balancing mode pre-charge enable signal is invalid;

an unbalancing mode current selecting circuit, configured to provide an unbalancing mode pre-charge enable signal based on a comparison result of the battery voltage with a battery voltage pre-charge threshold, and to provide an unbalancing mode CC enable signal based on a comparison result of the battery voltage with a battery voltage CC threshold, wherein when the battery voltage is lower than the battery voltage pre-charge threshold, both of the unbalancing mode pre-charge enable signal and the unbalancing mode CC enable signal are invalid, when the battery voltage is higher than the battery voltage pre-charge threshold, but is lower than the battery voltage CC threshold, the unbalancing mode pre-charge enable signal is valid and the unbalancing mode CC enable signal is invalid, when the battery voltage is higher than the battery voltage CC threshold, the unbalancing mode CC enable signal is valid and the unbalancing mode pre-charge enable signal is invalid; and a current regulating circuit, configured to provide the charging current based on the balancing connection indicating signal, the charging enable signal, the balance mode pre-charge enable signal, the balance mode CC enable signal, the unbalancing mode pre-charge enable signal, the unbalancing mode CC enable signal, the battery voltage, the cell voltage of each battery cell of the plurality of battery cells, wherein when the charging enable signal is valid, the charging current has different values determined by states of the balance mode pre-charge enable signal, the balance mode CC enable signal, the unbalancing mode pre-charge enable signal, the unbalancing mode CC enable signal.

3. The battery charging and balancing circuit of claim 2, wherein the charging enable circuit comprises:

a comparison circuit, configured to receive the battery voltage, the battery voltage CV threshold, the cell voltage of each battery cell of the plurality of battery cells, the cell voltage CV threshold, the charge-complete current threshold, the difference voltages respectively representing the difference between the cell voltage of each battery cell of the plurality of battery cells and the minimum cell voltage, and the second balance enable threshold, wherein the comparison circuit provides a first comparison signal based on a comparison result of the battery voltage and the battery voltage CV threshold, provides a second comparison signal based on comparison results of the cell voltage of each battery cell of the plurality of battery cells and the cell voltage CV threshold, provides a third comparison signal based on a comparison result of the charging current and the charge-complete current threshold, and provides a plurality of fourth comparison signals, wherein each fourth comparison signal is generated based on an comparison result of the second balance enable threshold and an associated difference voltage representing the difference between the cell voltage of the associated battery cell of the plurality of battery cells and the minimum cell voltage; and a logic gate circuit, configured to provide the charging enable signal based on performing a logic operation to the fault signal, the first comparison signal, the second comparison signal, the third comparison signal and the plurality of fourth comparison signals.

4. The battery charging and balancing circuit of claim 1, wherein the balancing circuit comprises:

a calculating circuit, configured to receive the cell voltage of each battery cell of the plurality of battery cells, and to provide a plurality of difference voltages, wherein each difference voltage represents a difference between the cell voltage of the associated battery cell of the plurality of battery cells and a minimum cell voltage;

a balance enable circuit, configured to provide a balance enable signal based on comparison results of a first balance enable threshold and the cell voltage of each battery cell of the plurality of battery cells;

a difference voltage comparison circuit, configured to provide a plurality of pre-control signals, wherein each pre-control signal is generated based on a comparison result of a second balance enable threshold and the difference voltage representing the difference between the cell voltage of the associated battery cell of the plurality of battery cells and a minimum cell voltage, and wherein when at least one of the difference voltages is higher than the second balance enable threshold, the associated pre-control signal is valid; and a logic circuit, configured to provide the plurality of control signals based on the plurality of pre-control signals and the balance enable signal, wherein when the balance enable signal is valid, each pre-control signal is provided as the associated control signal, and controls the associated discharging switch.

5. The battery charging and balancing circuit of claim 4, wherein the calculating circuit comprises:

a minimum value detecting circuit, configured to receive the cell voltage of each battery cell of the plurality of battery cells, and to provide the cell voltage with the minimum value as the minimum cell voltage; and a subtracting circuit, configured to receive the cell voltage of each battery cell of the plurality of battery cells and the minimum cell voltage, and to provide the plurality of difference voltages, wherein each difference voltage is generated based on a subtraction result of the cell voltage of the associated battery cell with the minimum cell voltage.

6. The battery charging and balancing circuit of claim 1, further comprising:

a voltage sensing circuit, configured to provide the battery voltage based on a charging voltage provided to the battery pack, and to provide the cell voltage of each battery cell of the plurality of battery cells based on the voltages at two adjacent cell voltage detecting pins coupled to the associated battery cell.

7. The battery charging and balancing circuit of claim 6, wherein the voltage sensing circuit comprises a subtracting circuit or a plurality of error amplifiers.

8. A control method of a battery charging and balancing system for charging a battery pack with a plurality of battery cells, comprising:

step A.1: detecting if any voltage at a plurality of cell voltage detecting pins of the battery charging and balancing system respectively coupled to an associated connection node between two adjacent battery cells of the plurality battery cells is higher than a ground threshold, if yes, enter into a cell-balancing mode, otherwise, enter into an unbalancing mode;

when in cell-balancing mode:

step A.2: charging the battery pack based on a cell voltage of each battery cell of the plurality of battery cells;

step A.3: monitoring if any cell voltage of the plurality of battery cells is higher than a first balance enable threshold, if yes, enabling the balance function and keeping charging the battery pack, if no, keeping charging the battery pack;

step A.4: monitoring if any cell voltage of the plurality of battery cells meets a condition that a difference between the cell voltage and a minimum cell voltage is higher than a second balance enable threshold, if yes, performing a balance process for a preset time period, if no, go to step A.6;

step A.5: determining if the balance process is completed, if yes, go to step A.6, if no, go to step A.4;

step A.6: determining if a charge-complete condition is met, if yes, stop charging, if no, go to step A.2;

when in the unbalancing mode:

step A.7: charging the battery pack based on a battery voltage of the battery pack;

step A.8: determining if the charge-complete condition is met, if yes, stop charging, if no, go to step A.7;

wherein through the whole charging and balancing process, charging the battery pack continues until the charge-complete condition is met.

9. The battery charging and balancing method of claim 8, wherein charging the battery pack based on the cell voltage of each battery cell of the plurality of battery cells comprises:

charging the battery pack with a charging current having a TC value when at least one cell voltage of the battery cell of the plurality of battery cells is lower than a cell voltage pre-charge threshold;

charging the battery pack with the charging current having a pre-charge value when the cell voltage of each battery cell of the plurality of battery cells is higher than the cell voltage pre-charge threshold, but at least one cell voltage of the battery cell of the plurality of battery cells is lower than a cell voltage CC threshold;

charging the battery pack with the charging current having a CC value when the cell voltage of each battery cell of the plurality of battery cells is higher than the cell voltage CC threshold, but is lower than a cell voltage CV threshold; and charging the battery pack with the charging current having a CV value when at least one cell voltage of the battery cell of the plurality of battery cells is higher than the cell voltage CV threshold.

10. The battery charging and balancing method of claim 8, wherein charging the battery pack based on the battery voltage of the battery pack comprises:

charging the battery pack with a charging current having a TC value when the battery voltage is lower than a battery voltage pre-charge value;

charging the battery pack with the charging current having a pre-charge value when the battery voltage is higher than the battery voltage pre-charge threshold, but is lower than a battery voltage CC threshold;

charging the battery pack with the charging current having a CC value when the battery voltage is higher than the battery voltage CC threshold, but is lower than a battery voltage CV threshold; and charging the battery pack with the charging current having a CV value when the battery voltage is higher than the battery voltage CV threshold.

11. The battery charging and balancing method of claim 8, wherein performing a balance process for a time period comprises:

shunting a charging current flowing to the cell which has a cell voltage meet a condition that a difference between the cell voltage and the minimum cell voltage is higher than a second balance enable threshold.

12. The battery charging and balancing method of claim 8, wherein determining if the balance process is completed comprises detecting if a voltage difference between a maximum cell voltage and the minimum cell voltage is lower than the second balance enable threshold, wherein, if yes, the balance process is completed, otherwise, the balance process is not completed.

13. The battery charging and balancing method of claim 8, wherein determining if a charge-complete condition is met comprises:
   detecting if the battery voltage reaches a battery voltage CV threshold; and
   detecting if the charging current is lower than a charge-complete current threshold.

14. A battery system comprising:
   a battery pack having a plurality of battery cells coupled in series;
   a detecting circuit, configured to receive a ground threshold, wherein the detecting circuit has a plurality of cell voltage detecting pins, and each one of the plurality of cell voltage detecting pins is coupled to an associated connection node between two adjacent battery cells of the plurality of battery cells when the battery system works in a cell-balancing mode, and wherein the detecting circuit provides a balancing connection indicating signal based on comparison results of the ground threshold with a voltage at each cell voltage detecting pin of the plurality of cell voltage detecting pins, and wherein the balancing connection indicating signal is valid only when the voltage at each cell voltage detecting pins of the plurality of cell voltage detecting pin is higher than the ground threshold;
   a charging circuit, configured to receive the balancing connection indicating signal, the voltage at each cell voltage detecting pin of the plurality of cell voltage detecting pins, a cell voltage of each battery cell of the plurality of battery cells and a battery voltage of the battery pack, wherein when the balancing connection indicating signal is valid, the charging circuit provides a charging current to a battery pack based on the cell voltage of each battery cell of the plurality of battery cells, and when the balancing connection indicating signal is invalid, the charging circuit provides the charging current to the battery pack based on the battery voltage; and
   a balancing circuit, configured to receive the balancing connection indicating signal and the cell voltage of each battery cell of the plurality of battery cells, wherein when the balancing connection indicating signal is valid, the balancing circuit provides a plurality of control signals based on the cell voltage of each battery cell of the plurality of battery cells, and wherein each one of the plurality of control signals is provided to an associated discharging switch of a plurality of discharging switches, wherein each one of the plurality of discharging switches is coupled to the associated battery cell of the plurality of battery cells.

15. The battery system of claim 14, wherein the charging circuit comprises:
   a charging enable circuit, configured to provide a charging enable signal based on a fault signal, the battery voltage, the cell voltage of each battery cell of the plurality of battery cells, a plurality of difference voltages respectively representing a difference between the cell voltage of each battery cell of the plurality of battery cells and a minimum cell voltage, the charging current, a battery voltage threshold, a cell voltage CV threshold, a charge-complete current threshold and a second balance enable threshold;
   a cell-balancing mode current selecting circuit, configured to provide a cell-balancing mode pre-charge enable signal based on comparison results of a cell voltage pre-charge threshold with the cell voltage of each battery cell of the plurality of battery cells, and to provide a cell-balancing mode CC enable signal based on comparison results of a cell voltage CC threshold with the cell voltage of each battery cell of the plurality of battery cells, wherein when at least one cell voltage of the battery cell of the plurality of battery cells is lower than the cell voltage pre-charge threshold, both of the cell-balancing mode pre-charge enable signal and the cell-balancing mode CC enable signal are invalid, when the cell voltage of each battery cell of the plurality of battery cells is higher than the cell voltage pre-charge threshold, and at least one cell voltage of the battery cell of the plurality battery cells is lower than the cell voltage CC threshold, the cell-balancing mode pre-charge enable signal is valid and the cell-balancing mode CC enable signal is invalid, when the cell voltage of each battery cell of the plurality of battery cells is higher than the cell voltage CC threshold, the cell-balancing mode CC enable signal is valid and the cell-balancing mode pre-charge enable signal is invalid;
   an unbalancing mode current selecting circuit, configured to provide an unbalancing mode pre-charge enable signal based on a comparison result of the battery voltage with a battery voltage pre-charge threshold, and to provide an unbalancing mode CC enable signal based on a comparison result of the battery voltage with a battery voltage CC threshold, wherein when the battery voltage is lower than the battery voltage pre-charge threshold, both of the unbalancing mode pre-charge enable signal and the unbalancing mode CC enable signal are invalid, when the battery voltage is higher than the battery voltage pre-charge threshold, but is lower than the battery voltage CC threshold, the unbalancing mode pre-charge enable signal is valid and the unbalancing mode CC enable signal is invalid, when the battery voltage is higher than the battery voltage CC threshold, the unbalancing mode CC enable signal is valid and the unbalancing mode pre-charge enable signal is invalid; and
   a current regulating circuit, configured to provide the charging current based on the balancing connection indicating signal, the charging enable signal, the cell-balancing mode pre-charge enable signal, the cell-balancing mode CC enable signal, the unbalancing mode pre-charge enable signal, the unbalancing mode CC enable signal, the battery voltage, the cell voltage of each battery cell of the plurality of battery cells, wherein when the charging enable signal is valid, the charging current has different values determined by states of the balance mode pre-charge enable signal, the balance mode CC enable signal, the unbalancing mode pre-charge enable signal, the unbalancing mode CC enable signal.

16. The battery system of claim 15, wherein the charging enable circuit comprises:
   a comparison circuit, configured to receive the battery voltage, the battery voltage CV threshold, the cell voltage of each battery cell of the plurality of battery cells, the cell voltage CV threshold, the charge-complete current threshold, the difference voltages respectively representing the difference between the cell voltage of each battery cell of the plurality of battery cells and the minimum cell voltage, and the second balance enable threshold, wherein the comparison circuit provides a first comparison signal based on a comparison result of the battery voltage and the battery voltage CV threshold, provides a second comparison signal based on comparison results of the cell voltage of each battery cell of the plurality of battery cells and the cell voltage CV threshold, provides a third comparison signal based on a comparison result of the charging current and the charge-complete current threshold, and provides a plurality of fourth comparison signals, wherein each fourth comparison signal is generated based on an comparison result of the second balance threshold and an associated difference voltage representing the difference between the cell voltage of the associated battery cell of the plurality of battery cells and the minimum cell voltage; and a logic gate circuit, configured to provide the charging enable signal based on performing logic operation to the fault signal, the first comparison signal, the second comparison signal, the third comparison signal and the plurality of fourth comparison signals.

17. The battery system of claim 14, wherein the balancing circuit comprises:

a calculating circuit, configured to receive the cell voltage of each battery cell of the plurality of battery cells, and to provide a plurality of difference voltages, wherein each difference voltage represents a difference between and the cell voltage of the associated battery cell of the plurality of battery cells and a minimum cell voltage;

a balance enable circuit, configured to provide a balance enable signal based on comparison results of a first balance enable threshold and the cell voltage of each battery cell of the plurality of battery cell;

a difference voltage comparison circuit, configured to provide a plurality of pre-control signals, wherein each pre-control signal is generated based on a comparison result of a second balance enable threshold and the difference voltage representing the difference between the cell voltage of the associated battery cell of the plurality of battery cells and a minimum cell voltage, and wherein when at least one of the difference voltages is higher than the second balance enable threshold, the associated pre-control signal is valid; and a logic circuit, configured to provide the plurality of control signals based on the plurality of pre-control signals and the balance enable signal, wherein when the balance enable signal is valid, each pre-control signal is provided as the associated control signal, and controls the associated discharging switch.

18. The battery system of claim 17, wherein the calculating circuit comprises:

a minimum value detecting circuit, configured to receive the cell voltage of each battery cell of the plurality of battery cells, and to provide the cell voltage with the minimum value as the minimum cell voltage; and a subtracting circuit, configured to receive the cell voltage of each battery cell of the plurality of battery cells and the minimum cell voltage, and to provide the plurality of difference voltages, wherein each difference voltage is generated based on a subtraction result of the cell voltage of the associated battery cell with the minimum cell voltage.

19. The battery system of claim 14, further comprising:

a voltage sensing circuit, configured to provide the battery voltage based on a charging voltage provided to the battery pack, and to provide the cell voltage of each battery cell of the plurality of battery cells based on the voltages at two adjacent the cell voltage detecting pins coupled to the associated battery cell.

20. The battery system of claim 19, wherein the voltage sensing circuit comprises a subtracting circuit or a plurality of error amplifiers.

* * * * *